United States Patent
Takeoka

(10) Patent No.: US 12,547,847 B2
(45) Date of Patent: Feb. 10, 2026

(54) INFORMATION PROCESSING DEVICE, INFORMATION PROCESSING METHOD, AND RECORDING MEDIUM FOR TAXONOMY EXPANSION DECISION MAKING

(71) Applicant: NEC Corporation, Tokyo (JP)

(72) Inventor: Kunihiro Takeoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 237 days.

(21) Appl. No.: 18/274,197

(22) PCT Filed: Jan. 29, 2021

(86) PCT No.: PCT/JP2021/003131
§ 371 (c)(1),
(2) Date: Jul. 25, 2023

(87) PCT Pub. No.: WO2022/162851
PCT Pub. Date: Aug. 4, 2022

(65) Prior Publication Data
US 2024/0095465 A1    Mar. 21, 2024

(51) Int. Cl.
*G06F 40/40*    (2020.01)
*G06F 40/242*   (2020.01)
(Continued)

(52) U.S. Cl.
CPC ............ *G06F 40/40* (2020.01); *G06F 40/242* (2020.01); *G06F 40/247* (2020.01); *G06F 40/30* (2020.01)

(58) Field of Classification Search
CPC ........ G06F 40/30; G06F 40/40; G06F 40/242; G06F 40/247
See application file for complete search history.

(56) References Cited

U.S. PATENT DOCUMENTS

| | | | | |
|---|---|---|---|---|
| 2002/0032564 A1* | 3/2002 | Ehsani | | G06F 40/40 |
| | | | | 704/E15.04 |
| 2004/0249628 A1 | 12/2004 | Chelba et al. | | |

(Continued)

FOREIGN PATENT DOCUMENTS

| | | |
|---|---|---|
| JP | 2004-362584 A | 12/2004 |
| JP | 2009-534735 A | 9/2009 |

(Continued)

OTHER PUBLICATIONS

Shen et al., "Hiexpan: Task-guided taxonomy construction by hierarchical tree expansion." Proceedings of the 24th ACM SIGKDD International Conference on Knowledge Discovery & Data Mining. (Year: 2018).*

(Continued)

*Primary Examiner* — Samuel G Neway
(74) *Attorney, Agent, or Firm* — Sughrue Mion, PLLC

(57) ABSTRACT

In order to expand a taxonomy more accurately, an information processing apparatus (1) includes: an obtaining section (11) that obtains a taxonomy which indicates a relationship between a plurality of phrases; a generating section (12) that generates a new phrase which differs from each of the plurality of phrases, with reference to a first sentence group; and an expanding section (13) that expands the taxonomy by associating the new phrase with any of the plurality of phrases. One or both of the generating section (12) and the expanding section (13) use a language model.

9 Claims, 10 Drawing Sheets

(51) Int. Cl.
  *G06F 40/247* (2020.01)
  *G06F 40/30* (2020.01)

(56) References Cited

U.S. PATENT DOCUMENTS

| | | | |
|---|---|---|---|
| 2006/0206313 A1* | 9/2006 | Xu | G06F 40/242 704/10 |
| 2007/0250487 A1 | 10/2007 | Reuther | |
| 2012/0284306 A1* | 11/2012 | Minnich | G06F 16/374 707/E17.014 |
| 2012/0303611 A1 | 11/2012 | Kusumura et al. | |
| 2015/0142782 A1* | 5/2015 | Moon | G06F 16/5846 707/722 |
| 2015/0199417 A1* | 7/2015 | Ashparie | G06F 40/30 707/737 |
| 2016/0217127 A1* | 7/2016 | Segal | G06F 40/289 |
| 2020/0013022 A1* | 1/2020 | Lewis | G06F 40/284 |
| 2020/0125798 A1* | 4/2020 | Beaver | A61K 31/41 |
| 2020/0184151 A1* | 6/2020 | Ekmekci | G06Q 10/0635 |
| 2020/0349226 A1* | 11/2020 | Ristoski | G06F 40/30 |
| 2024/0095465 A1* | 3/2024 | Takeoka | G06F 40/56 |

FOREIGN PATENT DOCUMENTS

| | | | |
|---|---|---|---|
| JP | 2010-108091 A | 5/2010 | |
| JP | 2012-078647 A | 4/2012 | |
| JP | WO2011/086820 A1 | 5/2013 | |
| KR | 10-2016-0121473 A | 10/2016 | |

OTHER PUBLICATIONS

Shen et al., "TaxoExpan: Self-supervised taxonomy expansion with position-enhanced graph neural network." Proceedings of the web conference (Year: 2020).*
International Search Report for PCT Application No. PCT/JP2021/003131, mailed on May 11, 2021.
Jiaming Shen et al., "HiExpan: Task-Guided Taxonomy Construction by Hierarchical Tree Expansion", KDD 2018.
Jiaming Shen et al., "TaxoExpan: Self-supervised Taxonomy Expansion with Position-Enhanced Graph Neural Network", WWW 2020.
Yuning Mao et al., "OCTET: Online Catalog Taxonomy Enrichment with Self-Supervision", KDD 2020.
Jue Wang et al., "Pyramid: A Layered Model for Nested Named Entity Recognition", ACL 2020.
Jingbo Shang et al., "Automated Phrase Mining from Massive Text Corpora", TKDE 2018.
Jacob Devlin et al., "BERT: Pre-training of Deep Bidirectional Transformers for Language Understanding", NAACL 2019.
Fabio Souza et al., "Portuguese Named Entity Recognition using BERT-CRF", arXiv 2019.
Zhanming Jie et al., "Better Modeling of Incomplete Annotations for Named Entity Recognition", NAACL-HLT 2019.
Suchin Gururangan et al., "Don't Stop Pretraining: Adapt Language Models to Domains and Tasks", ACL 2020.
Yinhan Liu et al., "RoBERTa: A Robustly Optimized BERT Pretraining Approach", arXiv 2019.

* cited by examiner

INFORMATION PROCESSING DEVICE, INFORMATION PROCESSING METHOD, AND RECORDING MEDIUM FOR TAXONOMY EXPANSION DECISION MAKING

This application is a National Stage Entry of PCT/JP2021/003131 filed on Jan. 29, 2021, the contents of all of which are incorporated herein by reference, in their entirety.

TECHNICAL FIELD

The present invention relates to a technique of expanding a taxonomy.

BACKGROUND ART

A technique of expanding a taxonomy is known. A taxonomy is information indicating a relationship between a plurality of phrases. The taxonomy is represented by a directed graph having a hierarchy.

For example, Non-Patent Literature 1 discloses a technique of expanding a target taxonomy in a lateral direction or a vertical direction, by specifying, from among existing phrases included in the target taxonomy, a phrase which is similar to a phrase to be added or a phrase which has a parent-child relationship with the phrase to be added.

For example, Non-Patent Literature 2 discloses a technique of expanding a target taxonomy, by specifying, with use of a determination model which determines a parent-child relationship between existing phrases included in the target taxonomy, an existing phrase which has a parent-child relationship with a phrase to be added.

For example, Non-Patent Literature 3 discloses a technique of expanding a taxonomy relating to a commodity with use of the taxonomy, a description of the commodity, a search query and an action log of a user.

CITATION LIST

Non-Patent Literature

[Non-patent Literature 1]
Jiaming Shen et al., "HiExpan: Task-Guided Taxonomy Construction by Hierarchical Tree Expansion", KDD 2018.
[Non-patent Literature 2]
Jiaming Shen et al., "TaxoExpan: Self-supervised Taxonomy Expansion with Position-Enhanced Graph Neural Network", WWW 2020.
[Non-patent Literature 3]
Yuning Mao et al., "Octet: Online Catalog Taxonomy Enrichment with Self-Supervision", KDD 2020.

SUMMARY OF INVENTION

Technical Problem

The techniques disclosed in Non-Patent Literatures 1 to 3 have room for improvement in terms of accurately expanding a taxonomy. For example, in the technique disclosed in Non-Patent Literature 1 or 2, it is difficult to accurately expand a taxonomy in a case where the number of phrases included in the taxonomy before expansion is small or in a case where a sentence group which is referred to in order to extract a phrase to be added is small. Further, in the technique disclosed in Non-Patent Literature 3, it is difficult to accurately expand a taxonomy in a case where a search query and an action log of a user cannot be obtained.

An example aspect of the present invention has been made in view of the above problems, and an example object thereof is to provide a technique of expanding a taxonomy more accurately.

Solution to Problem

An information processing apparatus according to an example aspect of the present invention includes at least one processor, the at least one processor carrying out: an obtaining process of obtaining a taxonomy which indicates a relationship between a plurality of phrases; a generating process of generating, with reference to a first sentence group, a new phrase which differs from each of the plurality of phrases; and an expanding process of expanding the taxonomy by associating the new phrase with any of the plurality of phrases, in one or both of the generating process and the expanding process, the at least one processor using a language model.

An information processing method according to an example aspect of the present invention is an information processing method carried out by at least one processor, the information processing method including: (a) obtaining a taxonomy which indicates a relationship between a plurality of phrases; (b) generating a new phrase which differs from each of the plurality of phrases, with reference to a first sentence group; and (c) expanding the taxonomy by associating the new phrase with any of the plurality of phrases, in one or both of (b) and (c), a language model being used.

A recording medium according to an example aspect of the present invention is a non-transitory recording medium in which a program for causing a computer to function as an information processing apparatus is recorded, the program causing the computer to carry out: an obtaining process of obtaining a taxonomy which indicates a relationship between a plurality of phrases; a generating process of generating a new phrase which differs from each of the plurality of phrases, with reference to a first sentence group; and an expanding process of expanding the taxonomy by associating the new phrase with any of the plurality of phrases, in one or both of the generating process and the expanding process, the program causing the computer to use a language model.

Advantageous Effects of Invention

According to an example aspect of the present invention, it is possible to expand a taxonomy more accurately.

DESCRIPTION OF EMBODIMENTS

First Example Embodiment

The following description will discuss, in detail, a first example embodiment of the present invention with reference to drawings. The first example embodiment is made the basis of example embodiments described later.

<Configuration of Information Processing Apparatus 1>

Figure 1:
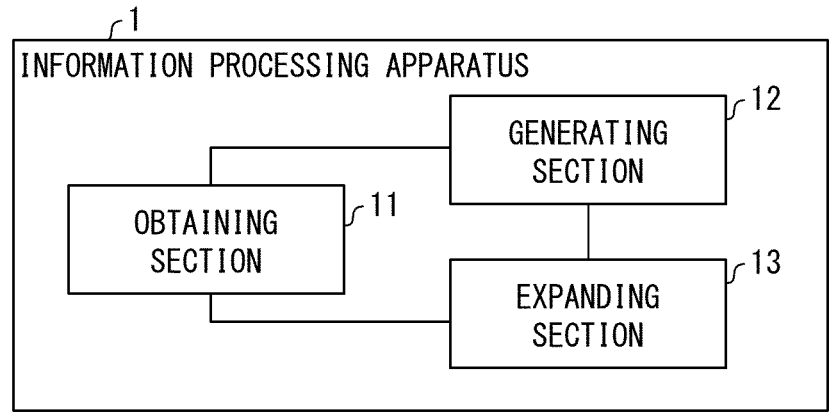
FIG. 1 is a block diagram illustrating a functional configuration of an information processing apparatus according to a first example embodiment of the present invention.

A configuration of an information processing apparatus 1 according to the first example embodiment is described with reference to FIG. 1. FIG. 1 is a block diagram illustrating a functional configuration of the information processing apparatus 1.

As illustrated in FIG. 1, the information processing apparatus 1 includes an obtaining section 11, a generating section 12, and an expanding section 13. The obtaining section 11 is an example of a configuration that realizes an obtaining means recited in the claims. The generating section 12 is an example of a configuration that realizes a generating means recited in the claims. The expanding section 13 is an example of a configuration that realizes an expanding means recited in the claims.

The obtaining section 11 obtains a taxonomy which indicates a relationship between a plurality of phrases. The generating section 12 generates a new phrase which differs from each of the plurality of phrases, with reference to a first sentence group. The expanding section 13 expands the taxonomy by associating the new phrase with any of the plurality of phrases. One or both of the generating section 12 and the expanding section 13 use a language model.

(Phrase)

A phrase is expressed by one or more words, and expresses a concept. For example, a phrase "pasta" expresses a concept of a kneaded product which mainly contains wheat flour and which is one of staple diets in Italian cuisine. The phrase "Italian cuisine" also expresses a concept of cuisine originating from Italy. In the following description, a "concept expressed by a phrase" is referred to simply as "phrase".

Therefore, an expression "a relationship exists between concepts expressed by respective two phrases" is referred to as "a relationship exists between two phrases". For example, the phrase "pasta" is included in the phrase "Italian cuisine". Therefore, a parent-child relationship exists between these phrases.

(Taxonomy)

A taxonomy is information indicating a relationship between a plurality of phrases. For example, the taxonomy is represented by a directed graph having a hierarchy. Specifically, the taxonomy includes (i) information indicating a node which indicates each phrase and (ii) information indicating an edge which connects two nodes having a parent-child relationship therebetween.

(New Phrase)

A new phrase is a phrase which differs from each of a plurality of phrases included in a taxonomy, and is a phrase that is to be added to the taxonomy. In other words, the new phrase is a phrase which is not included in the taxonomy before expansion.

(Existing Phrase)

Hereinafter, each phrase included in a taxonomy before expansion is referred to as "existing phrase" so as to be distinguished from a new phrase, which is not included in the taxonomy before expansion.

(First Sentence Group)

A first sentence group is a group of sentences. The first sentence group is referred to when a phrase to be added to a taxonomy is generated. The first sentence group is desirably a group of sentences relevant to existing phrases.

(Language Model)

A language model is a model that outputs a degree of confidence in a word string inputted thereinto. For example, a degree of confidence outputted in a case where a word string "his age is 100" is inputted into a language model is higher than a degree of confidence outputted in a case where a word string "his birthday is 100" is inputted into the language model. This is because this language model holds (i) a degree of confidence in a case where a relationship between "he" and "100" is "age" and (ii) a degree of confidence in a case where the relationship is "birthday" and the degree of confidence in the case where the relationship is "age" is higher than that in the case where the relationship is "birthday". Further, with respect to a word string in which a word is masked, it is possible to predict, with use of the language model, a word which is suitable to a masked location. As an example of the language model, a language model generated by Reference Literature 1 or 2 below can be, for example, applied.

[Reference Literature 1] Jacob Devlin et al., "BERT: Pre-training of Deep Bidirectional Transformers for Language Understanding", NAACL 2019.

[Reference Literature 2] Yinhan Liu et al., "RoBERTa: A Robustly Optimized BERT Pretraining Approach", arXiv 2019.

<Flow of Information Processing Method S1>

Figure 2:
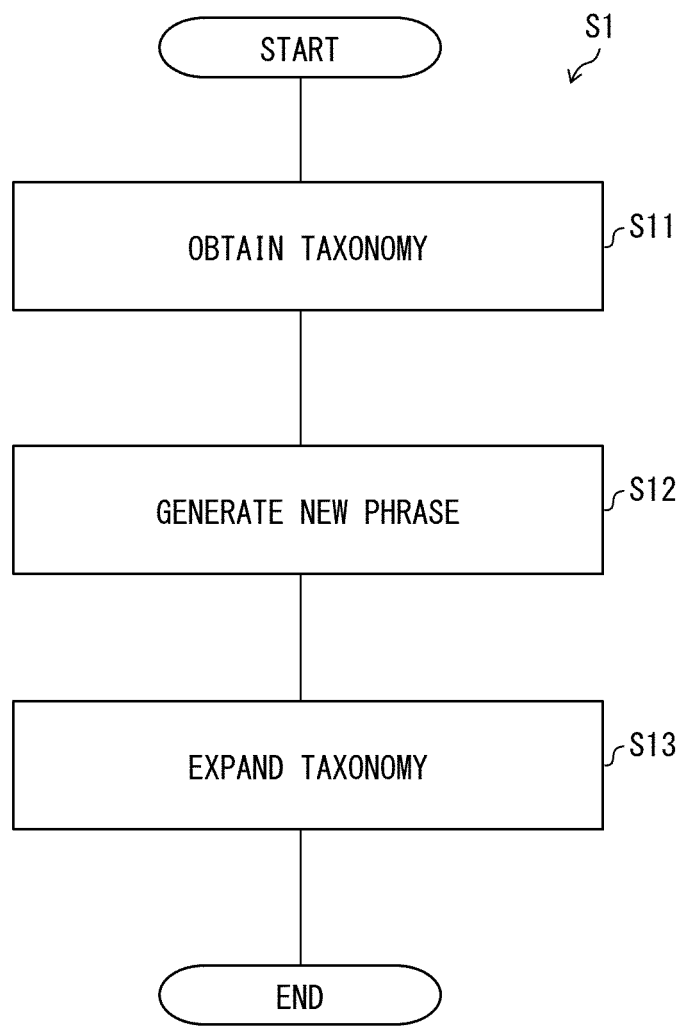
FIG. 2 is a flowchart illustrating a flow of an information processing method according to the first example embodiment of the present invention.

A flow of an information processing method S1 carried out by the information processing apparatus 1 configured as described above is described with reference to FIG. 2. FIG. 2 is a flowchart illustrating the flow of the information processing method S1. As illustrated in FIG. 2, the information processing method S1 includes steps S11 to S13.

(Step S11)

In the step S11, the obtaining section 11 obtains a taxonomy to be expanded. For example, the obtaining section 11 may obtain the taxonomy stored in a memory (not illustrated) of the information processing apparatus 1 or may alternatively obtain the taxonomy from another apparatus which is connected to the information processing apparatus 1 via a network.

(Step S12)

In the step S12, the generating section 12 generates a new phrase which differs from each of a plurality of phrases that are included in the taxonomy obtained in the step S11, with reference to a first sentence group. For example, the generating section 12 may refer to the first sentence group stored in the memory (not illustrated) of the information processing apparatus 1 or may alternatively refer to the first sentence group stored in another apparatus which is connected to the information processing apparatus 1 via a network. In this step, the generating section 12 may or may not use a language model so as to generate the new phrase with reference to the first sentence group. Note, however, that, in at least one of the steps S12 and S13, which is described later, the language model is used.

(Case where Language Model is Used)

For example, the generating section 12 may use the language model stored in the memory (not illustrated) of the information processing apparatus 1 or may alternatively use the language model stored in another apparatus which is connected to the information processing apparatus 1 via a network. Specifically, for example, the generating section 12 may generate the new phrase by predicting, with use of the language model, the new phrase that is suitable to a location which is in the first sentence group and which is of an existing phrase. Note that a method of generating the new phrase with reference to the first sentence group and with use of the language model is not limited to such an example.

(Case where Language Model is not Used)

For example, the generating section 12 may extract, from the first sentence group, the new phrase which is relevant to an existing phrase, with reference to a general knowledge base. Note that a method of generating the new phrase with reference to the first sentence group and without use of the language model is not limited to such an example.

(Step S13)

In the step S13, the expanding section 13 expands the taxonomy by associating the new phrase with any of the plurality of existing phrases. In this step, the expanding section 13 may or may not use the language model so as to associate the new phrase with any of the plurality of existing phrases. Note, however, that, as described above, in at least one of the steps S12 and S13, the language model is used. Note that in a case where the language model is used in both of the steps S12 and S13, each section may use an identical language model or may use different language models.

(Case where Language Model is Used)

For example, the expanding section 13 may use the language model stored in the memory (not illustrated) of the information processing apparatus 1 or may alternatively use the language model stored in another apparatus which is connected to the information processing apparatus 1 via a network. Specifically, for example, the generating section 12 may calculate, with use of the language model, a degree of confidence in a sentence in which a relationship between the new phrase and any of the plurality of existing phrases is hypothesized, and carry out association on the basis of the degree of confidence calculated. Note that a method of associating the new phrase with any of the plurality of existing phrases with use of the language model is not limited to such an example.

(Case where Language Model is not Used)

For example, the expanding section 13 calculates a degree of similarity between the new phrase and any of the plurality of existing phrases, and carries out association on the basis of the degree of similarity calculated. For example, the degree of similarity may be a score indicating a degree of relevance between the new phrase and any of the plurality of existing phrases. Alternatively, the degree of similarity may be a probability value indicating how likely it is that the new phrase and any of the plurality of existing phrases will be associated. Note, however, that the degree of similarity is not limited to these examples. Note that a method of associating the new phrase with any of the plurality of existing phrases without use of the language model is not limited to such an example.

Example Effects of the First Example Embodiment

As described above, the information processing apparatus 1 according to the first example embodiment uses the language model in one or both of (i) the generating process of generating the new phrase with reference to the first sentence group and (ii) the expanding process of associating the new phrase with any of the plurality of existing phrases included in the taxonomy. Thus, in a case where the language model is used in the generating process, it is possible to use information included in the language model, in addition to information included in the first sentence group. Therefore, it is possible to more accurately generate the new phrase to be added to the taxonomy. Furthermore, in a case where the language model is used in the expanding process, it is possible to correct a relationship between the new phrase and any of the plurality of existing phrases by utilizing a relationship between the phrases which relationship is indicated by the language model. Therefore, it is possible to more accurately associate the new phrase with any of the plurality of existing phrases. Therefore, in the first example embodiment, it is possible to expand the taxonomy more accurately.

Second Example Embodiment

The following description will discuss, in detail, a second example embodiment of the present invention with reference to drawings. Note that elements having the same functions as those described in the first example embodiment are denoted by the same reference numerals, and descriptions thereof will be omitted as appropriate.

<Configuration of Information Processing Apparatus 2>

Figure 3:
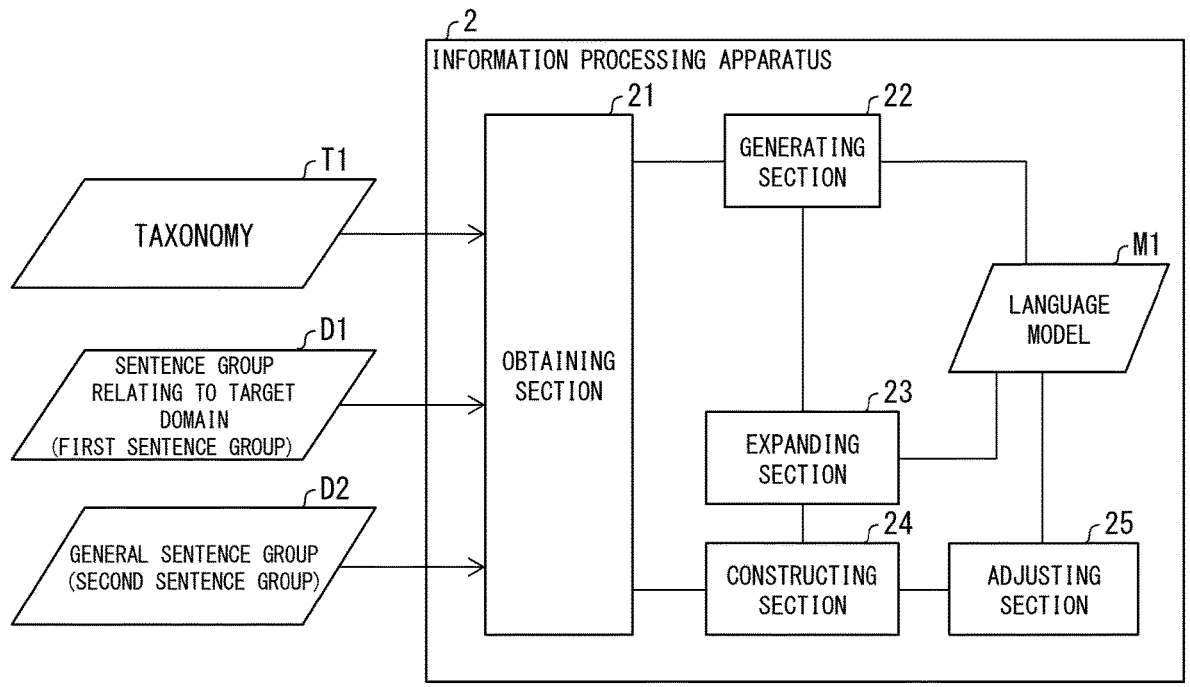
FIG. 3 is a block diagram illustrating a functional configuration of an information processing apparatus according to a second example embodiment of the present invention.

A configuration of an information processing apparatus 2 according to the second example embodiment is described with reference to FIG. 3. FIG. 3 is a block diagram illustrating a functional configuration of the information processing apparatus 2.

As illustrated in FIG. 3, the information processing apparatus 2 includes an obtaining section 21, a generating section 22, an expanding section 23, a constructing section 24, and an adjusting section 25. The obtaining section 21 is an example of the configuration that realizes the obtaining means recited in the claims. The generating section 22 is an example of the configuration that realizes the generating means recited in the claims. The expanding section 23 is an example of the configuration that realizes the expanding means recited in the claims. The constructing section 24 is an example of a configuration that realizes a constructing means recited in the claims. The adjusting section 25 is an example of a configuration that realizes an adjusting means recited in the claims.

The obtaining section 21 obtains a taxonomy T1 relating to a target domain, a sentence group D1 relating to the target domain, and a general sentence group D2. The constructing section 24 constructs a language model M1 on the basis of the sentence group D2. The adjusting section 25 adjusts the language model M1 on the basis of the sentence group D1. The generating section 22 generates a new phrase with reference to the sentence group D1 and with or without use of the language model M1. The expanding section 23 expands the taxonomy T1 by associating the new phrase with any of a plurality of existing phrases with or without use of the language model M1. Note that at least one of the generating section 22 and the expanding section 23 uses the language model M1.

(Taxonomy T1 Relating to Target Domain)

In the second example embodiment, the taxonomy T1 relating to the target domain is to be expanded. The taxonomy T1 relating to the target domain indicates a relationship between the plurality of phrases relating to the target domain. As an example, in a case where the target domain is "cuisine", the taxonomy T1 indicates a relationship between the plurality of phrases relating to the target domain "cuisine".

Figure 4:
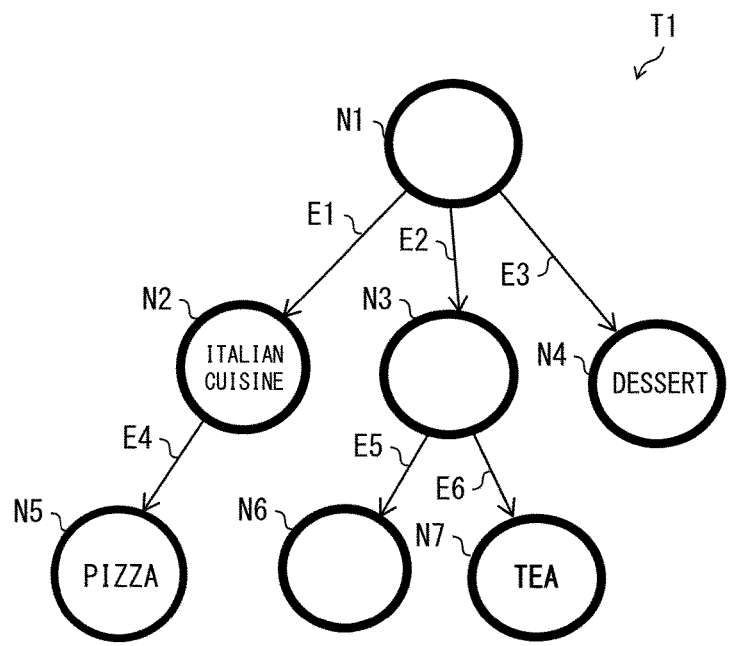
FIG. 4 schematically illustrates an example of a taxonomy T1 in the second example embodiment of the present invention.

FIG. 4 schematically illustrates an example of the taxonomy T1 relating to the target domain "cuisine". The taxonomy T1 is represented by a directed graph which includes nodes N1 to N7 and edges E1 to E6. The nodes N1 to N7 respectively correspond to the plurality of phrases relating to the target domain "cuisine". For example, the node N2 corresponds to a phrase "Italian cuisine". The node N4 corresponds to a phrase "dessert". The node N5 corresponds to a phrase "pizza". The node N7 corresponds to a phrase "tea". Each of the edges E1 to E6 indicates that a parent-child relationship exists between two phrases connected to both ends of the each of the edges E1 to E6. In FIG. 4, each of the edges E1 to E6 is represented by an arrow. A node connected to a base of the arrow is a parent, and a node connected to an arrowhead of the arrow is a child. For example, the edge E4 indicates that the phrase "Italian cuisine" corresponding to the node N2 which is connected to a base of the edge E4 is a parent and the phrase "pizza" corresponding to the node N5 which is connected to an arrowhead of the edge E4 is a child. That is, a parent-child relationship exists between the phrase "Italian cuisine" and the phrase "pizza", and the phrase "Italian cuisine" is a parent of the phrase "pizza".

(Sentence Group D1 Relating to Target Domain)

The sentence group D1 is an example of a "first sentence group" recited in the claims, and is a group of sentences relating to the target domain. For example, the sentence group D1 constitutes a part or the whole of information relating to the target domain. For example, the sentence group D1 may be a group of sentences which constitute a part or the whole of an online recipe site that is information relating to the domain "cuisine".

(General Sentence Group D2)

The sentence group D2 is an example of a "second sentence group" recited in the claims, and is a group of general sentences. Note, here, that "general" means that the sentences are not limited to the target domain. In other words, "general" means that the sentences relate to a plurality of domains. It can be said that, as the sentences included in the sentence group D2 relate to more domains, the sentence group D2 has a higher degree of generality. Note that the sentence group D2 can include a sentence relating to the target domain, as one of the general sentences. For example, the sentence group D2 is a group of sentences which constitute a part or the whole of general information. For example, the sentence group D2 may be a group of sentences which constitute a part or the whole of the Wikipedia site, which is general information.

(Language Model M1)

The language model M1 is a model that outputs a degree of confidence in a word string inputted thereinto. Details of the language model M1 are as described in the first example embodiment. In the second example embodiment, the language model M1 is constructed by the constructing section 24.

<Flow of Information Processing Method S2>

(Outline of Information Processing Method S2)

Figure 5:
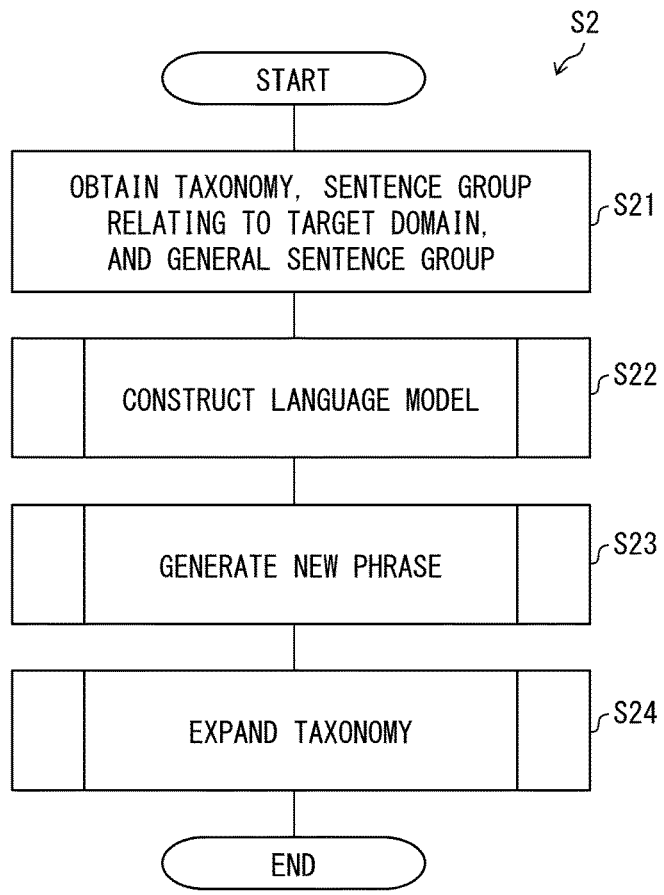
FIG. 5 is a flowchart illustrating a flow of an information processing method according to the second example embodiment of the present invention.

A flow of an information processing method S2 carried out by the information processing apparatus 2 configured as described above is described with reference to FIG. 5. FIG. 5 is a flowchart illustrating the flow of the information processing method S2. As illustrated in FIG. 5, the information processing method S2 includes steps S21 to S24.

(Step S21)

In the step S21, the obtaining section 21 obtains a taxonomy T1, a sentence group D1, and a sentence group D2. For example, the obtaining section 21 may obtain the taxonomy T1, the sentence group D1, or the sentence group D2 stored in a memory (not illustrated) of the information processing apparatus 2 or may alternatively obtain the taxonomy T1, the sentence group D1, or the sentence group D2 from another apparatus which is connected to the information processing apparatus 2 via a network.

(Step S22)

In the step S22, the constructing section 24 and the adjusting section 25 carry out a constructing process of constructing a language model M1. Details of the constructing process are described later.

(Step S23)

In the step S23, the generating section 22 carries out one of generating processes S23A and S23B in each of which the language model M1 is used, so as to generate a new phrase with reference to the sentence group D1. The generating process S23A is a process of generating the new phrase by extracting the new phrase from the sentence group D1 with use of the language model M1. That is, the new phrase generated by the generating process S23A is a phrase included in the sentence group D1. The generating process S23B is a process of generating the new phrase by predicting the new phrase from the sentence group D1 with use of the language model M1. That is, there is a possibility that the new phrase generated by the generating process S23B is not included in the sentence group D1. Note that the generating section 22 may carry out any generating process in which the language model M1 is not used, instead of carrying out one of the generating processes S23A and S23B. Details of these generating processes are described later.

(Step S24)

In the step S24, the expanding section 23 carries out one of expanding processes S24A and S24B in each of which the language model M1 is used, so as to expand the taxonomy T1. Alternatively, the expanding section 23 may carry out an expanding process in which the language model M1 is not used, instead of carrying out one of the expanding processes S24A and S24B. Details of these expanding processes are described later.

Note that, in at least one of the steps S23 and S24, the language model M1 is used. For example, in a case where the generating process in which the language model M1 is not used is carried out in the step S23, one of the expanding processes S24A and S24B in each of which the language model M1 is used is carried out in this step, and the expanding process in which the language model M1 is not used is not carried out in this step.

(Details of Process of Constructing Language Model M1)

Figure 6:
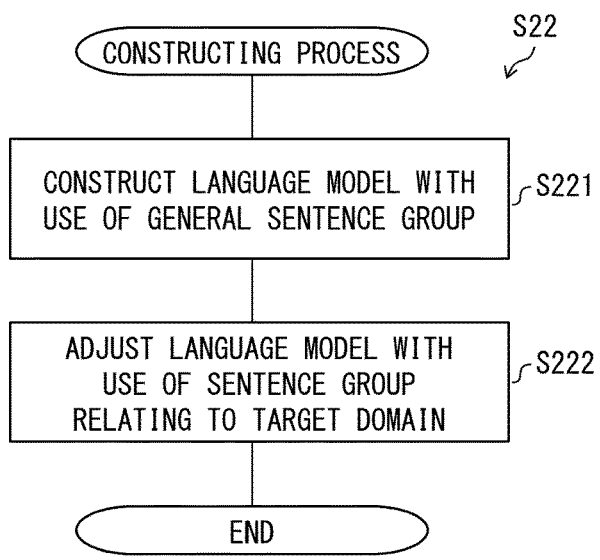
FIG. 6 is a flowchart illustrating a detailed flow of a process of constructing a language model in the second example embodiment of the present invention.

A detailed flow of the process of constructing the language model M1 in the step S22 is described with reference to FIG. 6. FIG. 6 is a flowchart illustrating the detailed flow of the process of constructing the language model M1. As illustrated in FIG. 6, the process in the step S22 includes steps S221 and S222.

(Step S221)

In the step S221, the constructing section 24 constructs the language model M1 with use of the sentence group D2. As a technique of constructing the language model M1, a technique disclosed in the above-described Reference Literature 1 or 2 can be applied. The language model M1 generated with use of the general sentence group D2 becomes a model relating to general phrases.

(Step S222)

In the step S222, the adjusting section 25 adjusts the language model M1 with use of the sentence group D1. As a technique of adjusting the sentence group, there is fine-tuning in which an existing language model is transferred to a language model for a specific domain. As the fine-tuning, a technique disclosed in Reference Literature 3 below can be applied. In this case, the adjusting section 25 can transfer the language model M1 relating to the general phrases to a target domain with use of the sentence group D1. Note, however, that a method in which the adjusting section 25 adjusts the language model M1 is not limited to that disclosed in Reference Literature 3.

[Reference Literature 3] Suchin Gururangan et al., "Don't Stop Pretraining: Adapt Language Models to Domains and Tasks", ACL 2020.

(Details of Generating Process S23A in which Language Model M1 is Used)

Figure 7:
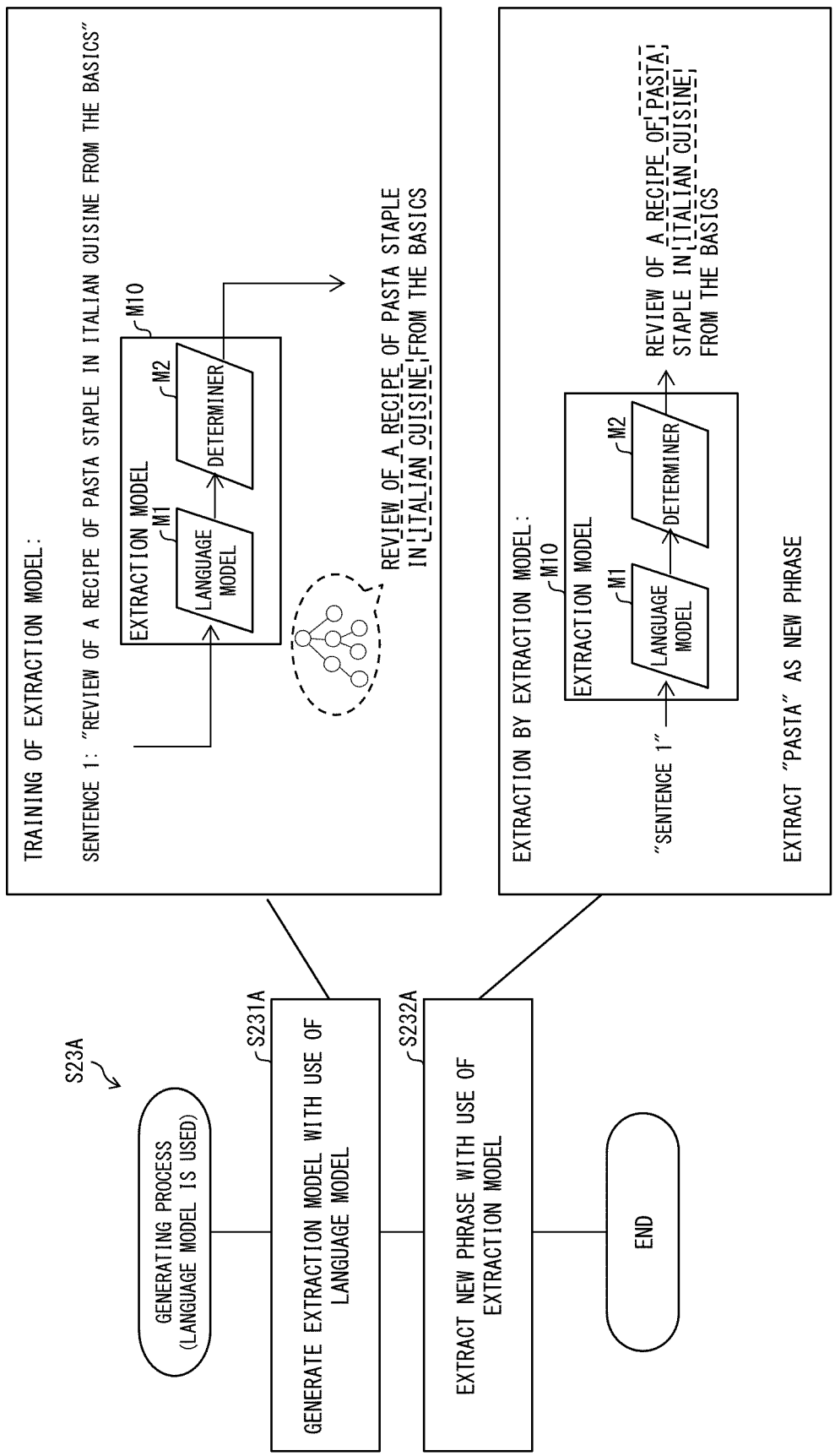
FIG. 7 is a flowchart illustrating a detailed flow of an example of a generating process in the second example embodiment of the present invention.

A detailed flow of the generating process S23A, which can be carried out in the step S23 and in which the language model M1 is used, is described with reference to FIG. 7. The generating process S23A is a process of extracting the new phrase from the sentence group D1 with use of an extraction model M10 including the language model M1. The new phrase to be extracted is a phrase included in the sentence group D1. FIG. 7 is a flowchart illustrating the detailed flow of the generating process S23A. As illustrated in FIG. 7, the generating process S23A includes steps S231A and S232A.

(Step S231A)

In the step S231A, the generating section 22 generates the extraction model M10 with use of the language model M1. The extraction model M10 includes the language model M1 and a determiner M2 into which an output from the language model M1 is inputted. The extraction model M10 is trained by machine learning so that, in a case where a sentence included in the sentence group D1 is inputted into the language model M1, the determiner M2 determines the new phrase in the sentence. This machine learning is carried out with use of training data in which a plurality of existing phrases that appear in the first sentence group are regarded as ground truth. As the determiner M2, for example, a sequence labeler can be applied. The extraction model M10 outputs the phrase determined by the determiner M2.

In the machine learning with respect to the extraction model M10, the sentence group D1 is used as the training data in which the existing phrases that appear in the sentence group D1 are labelled as ground truth. Note that, in the sentence group D1 serving as the training data, a phrase other than the existing phrases is not labeled. That is, the sentence group D1 is used as the training data in which labels indicating ground truth are partially given.

A process in this step is described with reference to a detailed example illustrated in FIG. 7. In this detailed example, the taxonomy T1 relating to the target domain "cuisine" illustrated in FIG. 4 is to be expanded. The sentence group D1 relating to the target domain "cuisine" includes a sentence 1 "review of a recipe of pasta staple in Italian cuisine from the basics". The generating section 22 generates the training data by labelling, as "ground truth", the existing phrase "Italian cuisine" appearing in the sentence 1. The generating section 22 does not label, as "not ground truth", any of the other phrases "staple", "pasta", "recipe", "basics" and "review" appearing in the sentence 1. Instead of labeling these phrases as "not ground truth", the generating section 22 does not label these phrases. By such machine learning in which the training data in which labels are partially given is used, the extraction model M10 is trained so that, in a case where the sentence 1 is inputted into the extraction model M10, the extraction model M10 outputs the existing phrase "Italian cuisine" and the new phrase "pasta" as phrases relating to the target domain "cuisine".

As a technique of generating the extraction model M10 in this manner, a technique BERT-CRF disclosed in Reference Literature 4 below can be, for example, used. The BERT-CRF is a technique of extracting a proper expression from a sentence group with use of a language model. By changing a process of extracting a proper expression in the BERT-CRF into a process of extracting a phrase relating to the target domain, it is possible for the generating section 22 to generate the extraction model M10.

[Reference Literature 4]: Fabio Souza et al., "Portuguese Named Entity Recognition using BERT-CRF", arXiv 2019.

As a technique of using the training data in which labels are partially given, a technique disclosed in Reference Literature 5 below can be, for example, used.

[Reference Literature 5]: Zhanming Jie et al., "Better Modeling of Incomplete Annotations for Named Entity Recognition", NAACL-HLT 2019.

Note that the extraction model M10 may be trained by machine learning so as to output different phrases that share a word. This is because different phrases relating to the target domain may share a word. For example, the sentence 1 relating to the target domain "cuisine" can be also considered to include "Italian cuisine" and "staple in Italian cuisine" as phrases relating to the cuisine. That is, "Italian cuisine" and "staple in Italian cuisine" are different phrases that share a word "Italian cuisine". In this case, it is desirable that the extraction model M10 be trained by machine learning so that, in a case where the sentence 1 is inputted into the language model M1, the determiner M2 not only determines "Italian cuisine" and "pasta" but also determines "staple in Italian cuisine". As a technique of determining such different phrases that share a word (i.e., a plurality of phrases that are nested), a technique disclosed in Reference Literature 6 below can be used.

[Reference Literature 6]: Jue Wang et al., "Pyramid: A Layered Model for Nested Named Entity Recognition", ACL 2020.

(Step S232A)

In the step S232A, the generating section 22 extracts the new phrase from the sentence group D1 with use of the extraction model M10 generated in the step S231A.

A process in this step is described with reference to the detailed example illustrated in FIG. 7. Specifically, the generating section 22 inputs the sentence 1 into the extraction model M10, and, out of the phrases "Italian cuisine" and "pasta" outputted, the generating section 22 extracts "pasta", which differs from the existing phrases, as the new phrase.

(Details of Generating Process S23B in which Language Model M1 is Used)

Figure 8:
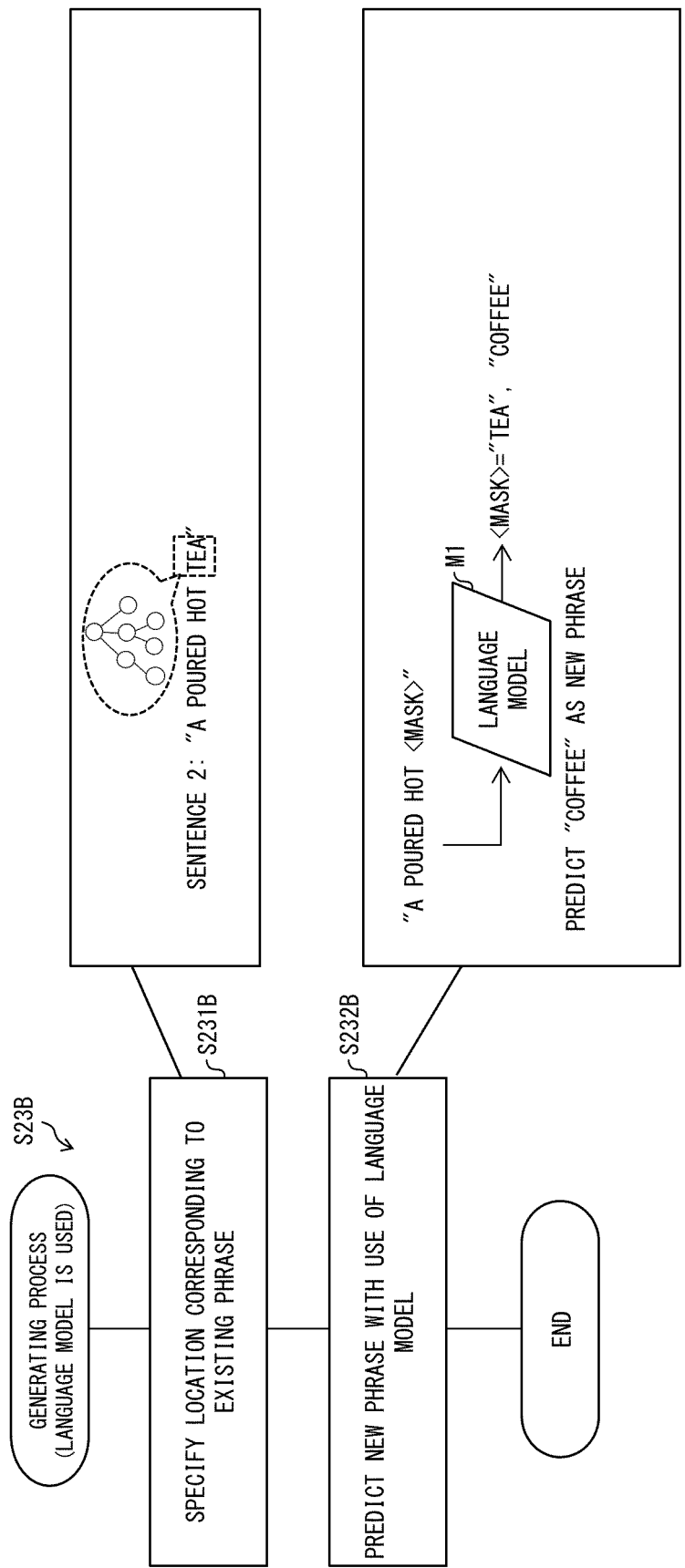
FIG. 8 is a flowchart illustrating a detailed flow of another example of the generating process in the second example embodiment of the present invention.

A detailed flow of the generating process S23B, which can be carried out in the step S23 and in which the language model M1 is used, is described with reference to FIG. 8. The generating process S23B is a process of predicting the new phrase with use of the sentence group D1 and the language model M1. The new phrase to be predicted may not be included in the sentence group D1. Therefore, in the generating process S23B, there is a possibility that more new phrases can be generated than in the generating process S23A. FIG. 8 is a flowchart illustrating the detailed flow of the generating process S23B of generating the new phrase. As illustrated in FIG. 8, the generating process S23B includes steps S231B and S232B.

(Step S231B)

In the step S231B, the generating section 22 specifies a location which is in a sentence included in the sentence group D1 and in which any of the plurality of existing phrases appears. A process in this step is described with reference to a detailed example illustrated in FIG. 8. In this detailed example, the taxonomy T1 relating to the target domain "cuisine" illustrated in FIG. 4 is to be expanded. The sentence group D1 relating to the target domain "cuisine" includes a sentence 2 "A poured hot tea". The generating section 22 specifies a location which is in the sentence 2 and in which the existing phrase "tea" appears.

(Step S232B)

In the step S232B, the generating section 22 generates the new phrase by predicting, with use of the language model M1, the new phrase that is suitable to the location specified.

A process in this step is described with reference to the detailed example illustrated in FIG. 8. The generating section 22 inputs, into the language model M1, a sentence obtained by masking the location specified in the sentence 2. Out of "tea" and "coffee" predicted by the language model M1, the generating section 22 extracts "coffee", which differs from the existing phrases, as the new phrase.

(Example of Generating Process in which Language Model M1 is not Used)

An example of the generating process which can be carried out in the step S23 and in which the language model M1 is not used to generate the new phrase is described.

For example, the generating section 22 may extract the new phrase from the sentence group D1 with use of a knowledge base and without use of the language model M1. The new phrase to be extracted is a phrase included in the sentence group D1. The knowledge base is desirably a knowledge base relating to general information. For example, the generating section 22 may use the knowledge base stored in the memory (not illustrated) of the information processing apparatus 2 or may alternatively obtain the knowledge base from another apparatus which is connected to the information processing apparatus 2 via a network and use the knowledge base obtained.

For example, with use of the knowledge base, the generating section 22 labels, as ground truth, phrases relating to the target domain, among phrases included in the sentence group D1. The generating section 22 generates an extraction model which extracts phrases from the sentence group D1, by machine learning in which the sentence group D1 in which labels indicating ground truth are given is used as training data. The generating section 22 regards, as the new phrase, a phrase that differs from the existing phrases, among the phrases extracted from the sentence group D1 with use of the extraction model generated. Note that a technique disclosed in Reference document 7 below can be applied as a technique of generating, with use of the knowledge base, the extraction model which extracts the phrases relating to the target domain from the sentence group D1.

[Reference Literature 7]: Jingbo Shang et al., "Automated Phrase Mining from Massive Text Corpora", TKDE 2018.

(Another Example of Generating Process in which Language Model M1 is not Used)

Another example of the generating process which can be carried out in the step S23 and in which the language model M1 is not used to generate the new phrase is described.

For example, the generating section 22 may extract the new phrase from the sentence group D1 with use of a BiLSTM-CRF model and without use of the language model M1. One input into the BiLSTM-CRF model is a word string, and the other input into the BiLSTM-CRF model is a label which determines a phrase relating to the target domain. In this case, the generating section 22 generates training data from the taxonomy T1 and the sentence group D1, and trains the BiLSTM-CRF model with use of the training data generated. As a technique of generating, from the taxonomy T1 and the sentence group D1, the training data used to train the BiLSTM-CRF model, the technique disclosed in Non-Patent Literature 3 can be applied. The generating section 22 extracts the new phrase from the sentence group D1 with use of the BiLSTM-CRF model generated.

(Details of Expanding Process S24A: Example of Expanding Process in which Language Model M1 is Used)

Figure 9:
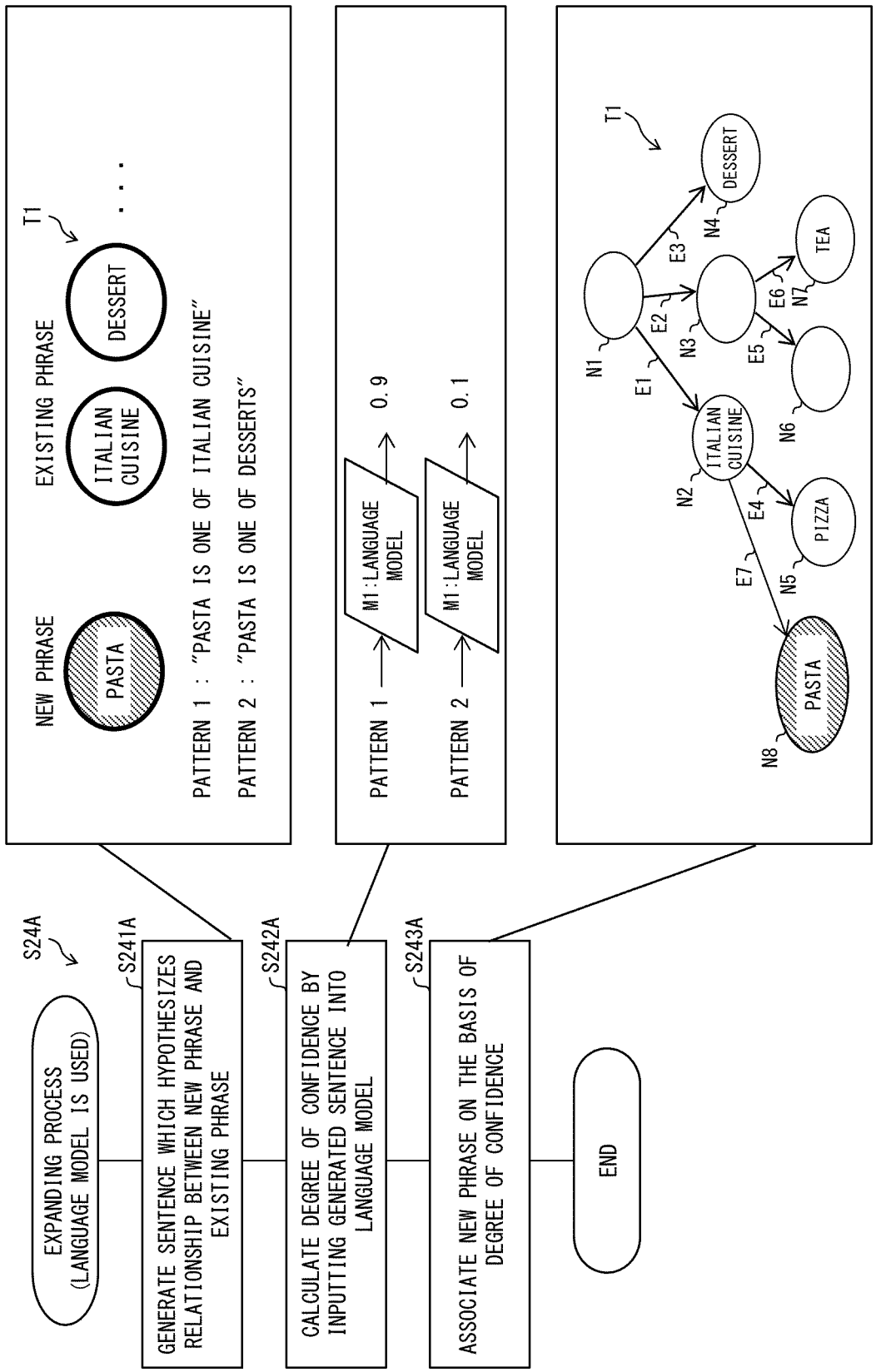
FIG. 9 is a flowchart illustrating a detailed flow of an example of an expanding process in the second example embodiment of the present invention.

A detailed flow of the expanding process S24A of expanding the taxonomy T1, which can be carried out in the step S24, is described with reference to FIG. 9. The expanding process S24A is a process of associating the new phrase with any of the existing phrases with use of the language model M1. FIG. 9 is a flowchart illustrating the detailed flow of the expanding process S24A. As illustrated in FIG. 9, the expanding process S24A includes steps S241A to S243A.

(Step S241A)

In the step S241A, the expanding section 23 generates sentences each including the new phrase and any of the plurality of existing phrases that are included in the taxonomy T1. Specifically, as the sentences each including the new phrase and any of the existing phrases, the expanding section 23 generates sentences in each of which a relationship between the new phrase and any of the existing phrases is hypothesized.

A process in this step is described with reference to a detailed example illustrated in FIG. 9. Here, a detailed example in which the taxonomy T1 that is illustrated in FIG. 4 and that relates to the target domain "cuisine" is expanded by adding "pasta", which is the new phrase, to the taxonomy T1 is described. As the sentences in each of which a relationship between the new phrase and any of the existing phrases is hypothesized, the expanding section 23 applies sentences "<dish name> is one of <cuisine category>". For example, the expanding section 23 generates a sentence of a pattern 1 "pasta is one of Italian cuisine", as a sentence in which a relationship between the existing phrase "Italian cuisine" and the new phrase "pasta" is hypothesized. The expanding section 23 further generates a sentence of a pattern 2 "pasta is one of desserts", as a sentence in which a relationship between the existing phrase "dessert" and the new phrase "pasta" is hypothesized. In this manner, the expanding section 23 generates, with respect to the respective existing phrases included in the taxonomy T1, sentences in each of which a relationship with the new phrase "pasta" is hypothesized.

(Step S242A)

In the step S242A, the expanding section 23 calculates, with use of the language model M1, degrees of confidence in the sentences generated.

A process in this step is described with reference to the detailed example illustrated in FIG. 9. The expanding section 23 obtains a degree of confidence of 0.9 that is outputted by inputting the sentence of the pattern 1 into the language model M1. The expanding section 23 further obtains a degree of confidence of 0.1 that is outputted by inputting the sentence of the pattern 2 into the language model M1. In this manner, the expanding section 23 obtains degrees of confidence with respect to the respective existing phrases included in the taxonomy T1.

(Step S243A)

In the step S243A, the expanding section 23 associates the new phrase with any of the plurality of existing phrases with reference to the degrees of confidence calculated.

A process in this step is described with reference to the detailed example illustrated in FIG. 9. For example, the sentence in which the relationship between the existing phrase "Italian cuisine", among the existing phrases included in the taxonomy T1, and the new phrase "pasta" is hypothesized has the highest degree of confidence. Thus, the expanding section 23 associates the new phrase "pasta" with the existing phrase "Italian cuisine". In other words, as illustrated in FIG. 9, the expanding section 23 connects a new node N8, which corresponds to the new phrase "pasta", to the node N2, which corresponds to the existing phrase "Italian cuisine", by a new edge E7. The edge E7 indicates that the phrase "Italian cuisine" corresponding to the node N2 which is connected to a base of the edge E7 is a parent and the phrase "pasta" corresponding to the node N8 which is connected to an arrowhead of the edge E7 is a child. That is, the phrase "Italian cuisine" is a parent of the phrase "pasta". In this manner, the taxonomy T1 is expanded.

(Details of Expanding Process S24B: Another Example of Expanding Process in which Language Model M1 is Used)

Figure 10:
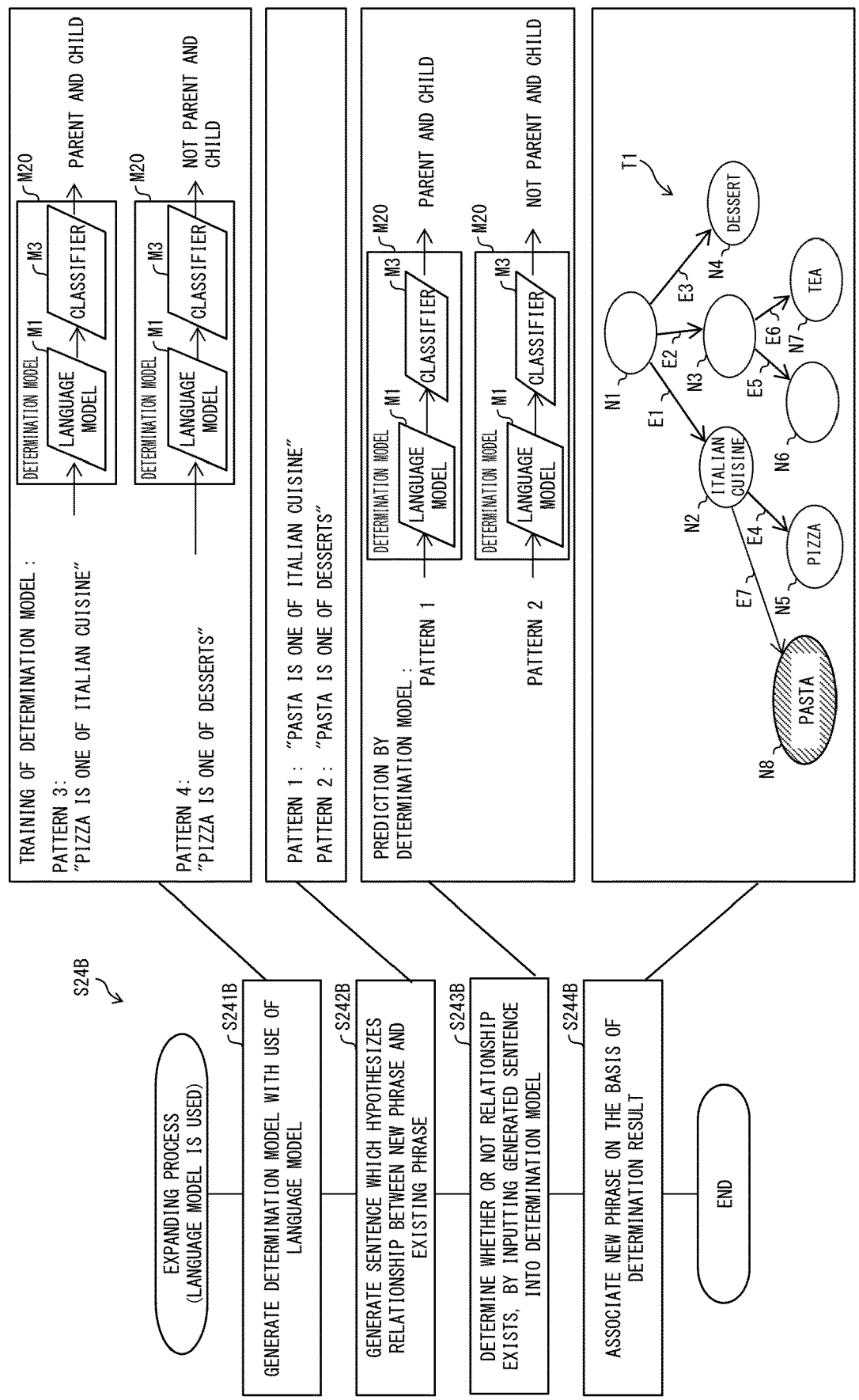
FIG. 10 is a flowchart illustrating a detailed flow of another example of the expanding process in the second example embodiment of the present invention.

A detailed flow of the expanding process S24B, which can be carried out in the step S24 and in which the language model M1 is used, is described with reference to FIG. 10. The expanding process S24B is a process of associating the new phrase with any of the plurality of existing phrases with use of a determination model M20 including the language model M1. FIG. 10 is a flowchart illustrating the detailed flow of the expanding process S24B. As illustrated in FIG. 10, the expanding process S24B includes steps S241B to S244B.

(Step S241B)

In the step S241B, the expanding section 23 generates the determination model M20 with use of the language model M1. The determination model M20 includes the language model M1 and a classifier M3 into which an output from the language model M1 is inputted. The determination model M20 is trained so that, in a case where a sentence including the new phrase and any of the plurality of existing phrases is inputted into the language model M1, the classifier M3 outputs information indicating whether or not a relationship exists. This training is carried out with use of training data in which whether or not a relationship exists between two of the plurality of existing phrases, which is indicated by the taxonomy T1, is regarded as ground truth. The determination model M20 outputs an output from the classifier M3.

A process in this step is described with reference to a detailed example illustrated in FIG. 10. Here, a detailed example in which the taxonomy T1 that is illustrated in FIG. 4 and that relates to the target domain "cuisine" is expanded by adding "pasta", which is the new phrase, to the taxonomy T1 is described.

In this detailed example, the training data is generated with respect to each of combinations of two existing phrases included in the sentence group D1. The training data includes (i) a sentence including the two existing phrases and (ii) information indicating whether or not a relationship exists between the two phrases. For example, the taxonomy T1 indicates that a parent-child relationship exists between the existing phrase "pizza" and the existing phrase "Italian cuisine". Thus, the expanding section 23 generates the training data that includes (i) a sentence of a pattern 3 "pizza is one of Italian cuisine" in which a relationship between these two phrases is hypothesized and (ii) information indicating "a parent and a child" as ground truth. The taxonomy T1 also indicates that no parent-child relationship exists between the existing phrase "pizza" and the existing phrase "dessert". Thus, the expanding section 23 generates the training data that includes (i) a sentence of a pattern 4 "pizza is one of desserts" in which a relationship between these two existing phrases is hypothesized and (ii) information indicating "not a parent and a child" as ground truth. In this manner, the expanding section 23 generates the training data with respect to each of combinations of two existing phrases included in the taxonomy T1. The expanding section 23 trains the determination model M20 with use of the training data generated.

(Step S242B)

In the step S242B, the expanding section 23 generates sentences each including the new phrase and any of the plurality of existing phrases that are included in the taxonomy T1. Specifically, as the sentences each including the new phrase and any of the existing phrases, the expanding section 23 generates sentences in each of which a relationship between the new phrase and any of the existing phrases is hypothesized.

A process in this step is described with reference to the detailed example illustrated in FIG. 10. Here, the expanding section 23 generates a sentence of a pattern 1 "pasta is one of Italian cuisine" and a sentence of a pattern 2 "pasta is one of desserts". The sentence of the pattern 1 and the sentence of the pattern 2 are as described in the step S241A. In this manner, the expanding section 23 generates, with respect to the respective existing phrases included in the taxonomy T1, sentences in each of which a relationship with the new phrase "pasta" is hypothesized.

(Step S243B)

In the step S243B, the expanding section 23 obtains determination results outputted from the determination model M20, by inputting the sentences generated into the determination model M20.

A process in this step is described with reference to the detailed example illustrated in FIG. 10. Here, in a case where the sentence of the pattern 1 is inputted into the determination model M20, the determination model M20 outputs information indicating "a parent and a child". Further, in a case where the sentence of the pattern 2 is inputted into the determination model M20, the determination model M20 outputs information indicating "not a parent and a child". In this manner, the expanding section 23 obtains a determination result on whether or not a relationship exists between the new phrase "pasta" and each of the existing phrases included in the taxonomy T1.

(Step S244B)

In the step S244B, the expanding section 23 associates the new phrase with any of the plurality of existing phrases with reference to the determination results.

A process in this step is described with reference to the detailed example illustrated in FIG. 10. For example, the expanding section 23 obtains the determination result indicating that the phrase "Italian cuisine", among the existing phrases included in the taxonomy T1, and the new phrase "pasta" are "a parent and a child". Thus, expanding section 23 associates the new phrase "pasta" with the phrase "Italian cuisine". In a case where there are a plurality of existing phrases on each of which a determination result indicating "a parent and a child" with respect to the new phrase "pasta" is obtained, the expanding section 23 associates the new phrase with any of the plurality of existing phrases. Thus, the node N8 and the edge E7 are added to the taxonomy T1, and, as a result, the taxonomy T1 is expanded. Details of the taxonomy T1 expanded are as described with reference to FIG. 9.

Note that the determination model M20 generated in the step S241B may output a degree of confidence in existence of a relationship as the information indicating whether or not a relationship exists. In this case, in the step S244B, the expanding section 23 may associate the new phrase with any of the existing phrases which has the highest degree of confidence in existence of a relationship.

(Example of Expanding Process in which Language Model M1 is not Used)

An example of the expanding process which can be carried out in the step S24 and in which the language model M1 is not used is described.

For example, the expanding section 23 may calculate a degree of similarity between the new phrase and any of the plurality of existing phrases included in the taxonomy T1, and associate the new phrase with any of the existing phrases on the basis of the degree of similarity calculated.

For example, the expanding section 23 calculates the degree of similarity between the new phrase and any of the existing phrases, with use of one or both of a degree of character string similarity and a degree of meaning similarity. For example, as the degree of character string similarity, the expanding section 23 may calculate an index such as edit distance, end_with, or jaccard similarity. Further, as the degree of meaning similarity, the expanding section 23 may calculate cosine similarity, a Euclidean distance, or the like between a meaning vector indicating any of the existing phrases and a meaning vector indicating the new phrase. Note that the expanding section 23 may calculate such a meaning vector by word2vec or the like.

For example, the expanding section 23 may associate the new phrase with any of the existing phrases of which one or both of the degree of character string similarity and the degree of meaning similarity are equal to or more than a threshold.

(Another Example of Expanding Process in which Language Model M1 is not Used)

Another example of the expanding process which can be carried out in the step S24 and in which the language model M1 is not used is described.

For example, the expanding section 23 may generate, by machine learning, a determiner into which one or both of a degree of character string similarity between two phrases and a meaning vector of each phrase are inputted and which outputs information indicating whether or not a relationship exists. In this case, the expanding section 23 associates the new phrase with any of the existing phrases on which a determination result, indicating that a relationship exists between the new phrase and the any of the existing phrases, is obtained with use of the determiner generated. In a case where there are a plurality of existing phrases on each of which a determination result indicating that a relationship exists is obtained, the expanding section 23 associates the new phrase with any of the plurality of existing phrases. Note that such a determiner may output a degree of confidence in existence of a relationship as the information indicating whether or not a relationship exists. In this case, the expanding section 23 may associate the new phrase with any of the existing phrases which has the highest degree of confidence in existence of a relationship.

Example Effects of the Second Example Embodiment

In the second example embodiment, in order to expand the taxonomy T1 relating to the target domain, the language model M1 generated from the general sentence group D2 is used in at least one of (i) the process of generating the new phrase with reference to the sentence group D1 relating to the target domain and (ii) the process of associating the new phrase with any of the plurality of existing phrases included in the taxonomy T1.

Note, here, the new phrase relating to the target domain may be able to be described by a combination of general phrases. Therefore, even in a case where the sentence group D1 includes a small amount of information, it is possible to more accurately generate, from the sentence group D1, the new phrase that relates to the target domain and that is to be added to the taxonomy T1, with use of information that is included in the language model M1 and that relates to the general phrases.

Further, the language model M1 indicates a relationship between general phrases. Therefore, it is possible to correct a relationship between the new phrase and any of the existing phrases with use of the relationship between the general phrases which relationship is indicated by the language model M1. As a result, even in a case where the sentence group D1 includes a small amount of information, it is possible to more accurately associate the new phrase with any of the existing phrases.

For example, in the second example embodiment, described below is an effect brought about in a case where the taxonomy T1 that relates to a domain "dish name" is expanded with use of (i) the language model M1 that is constructed from the general sentence group D2 and (ii) the sentence group D1 that is collected from an online recipe site. In a case where the generating process S23A in which the language model M1 is used is carried out in the step S23, it is possible to more accurately extract, as the new phrase, a dish name and a cuisine category that are included in the online recipe site. In a case where the generating process S23B in which the language model M1 is used is carried out in the step S23, it is possible to predict, as the new phrase, a dish name or a cuisine category that are not included in the online recipe site. Moreover, in the case where the expanding process S24A or S24B in which the language model M1 is used is carried out in the step S24, it is possible to more accurately associate a new dish name or a new cuisine category with an existing dish name or an existing cuisine category.

Third Example Embodiment

The following description will discuss, in detail, a third example embodiment of the present invention with reference to a drawing. Note that elements having the same functions as those described in the second example embodiment are denoted by the same reference numerals, and descriptions thereof will be omitted as appropriate.

<Configuration of Information Processing Apparatus 3>

Figure 11:
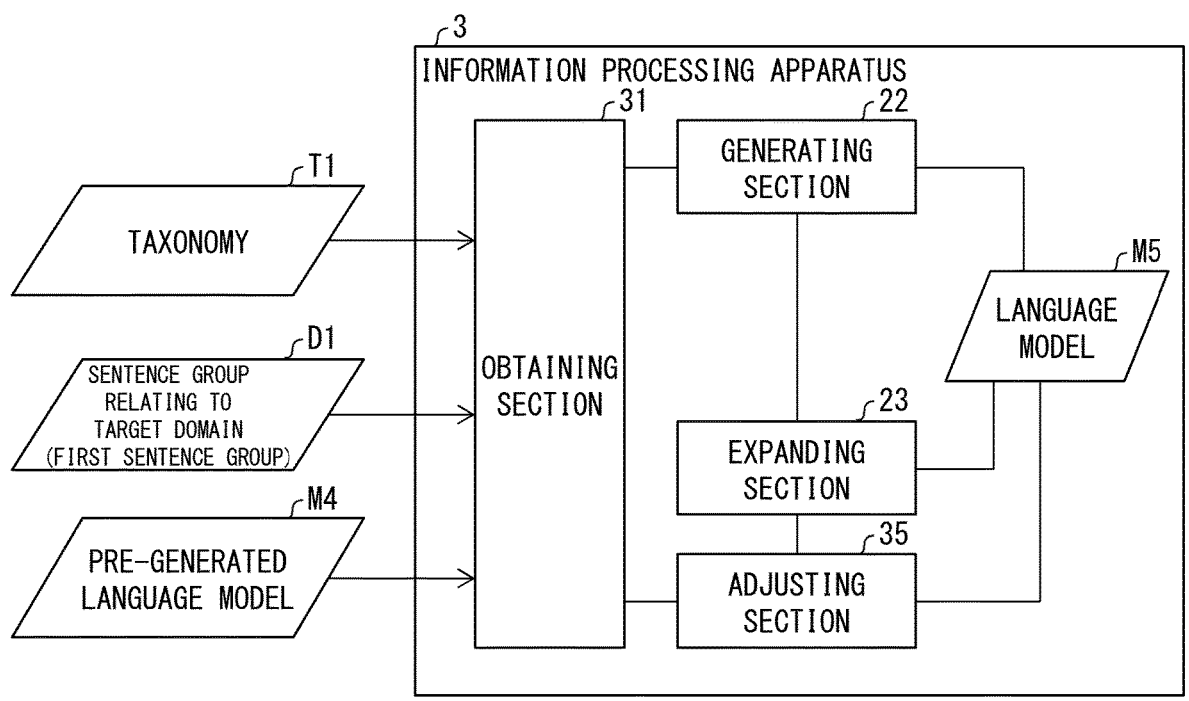
FIG. 11 is a block diagram illustrating a functional configuration of an information processing apparatus 3 according to a third example embodiment of the present invention.

A configuration of an information processing apparatus 3 according to the third example embodiment is described with reference to FIG. 11. FIG. 11 is a block diagram illustrating a functional configuration of the information processing apparatus 3.

As illustrated in FIG. 11, the information processing apparatus 3 is configured in substantially the same manner as the information processing apparatus 2 according to the second example embodiment, but the information processing apparatus 3 differs from the information processing apparatus 2 in that the information processing apparatus 3 includes an obtaining section 31 instead of the obtaining section 21 and an adjusting section 35 instead of the adjusting section 25. The information processing apparatus 3 also differs from the information processing apparatus 2 in that the information processing apparatus 3 does not include the constructing section 24. The obtaining section 31 is an example of the configuration that realizes the obtaining means recited in the claims. The adjusting section 35 is an example of the configuration that realizes the adjusting means recited in the claims.

(Obtaining Section 31)

The obtaining section 31 is configured in substantially the same manner as the obtaining section 21 in the second example embodiment, but the obtaining section 31 differs from the obtaining section 21 in that the obtaining section 31 obtains a pre-generated language model M4, instead of obtaining the general sentence group D2.

(Pre-Generated Language Model M4)

The pre-generated language model M4 is a model that outputs a degree of confidence in a word string inputted thereinto. Details of the pre-generated language model M4 are as described in the first example embodiment. The pre-generated language model M4 is a model that has been generated by an apparatus differing from the information processing apparatus 3. For example, as the pre-generated language model M4, a published language model may be applied.

(Constructing Section 32)

The constructing section 32 constructs a language model M5 by adjusting the pre-generated language model M4 with use of a sentence group D1. A technique that can be applied to a process of adjusting the language model M4 with use of the sentence group D1 is as described in connection with the adjusting section 25 in the second example embodiment.

<Flow of Information Processing Method S3>

Figure 12:
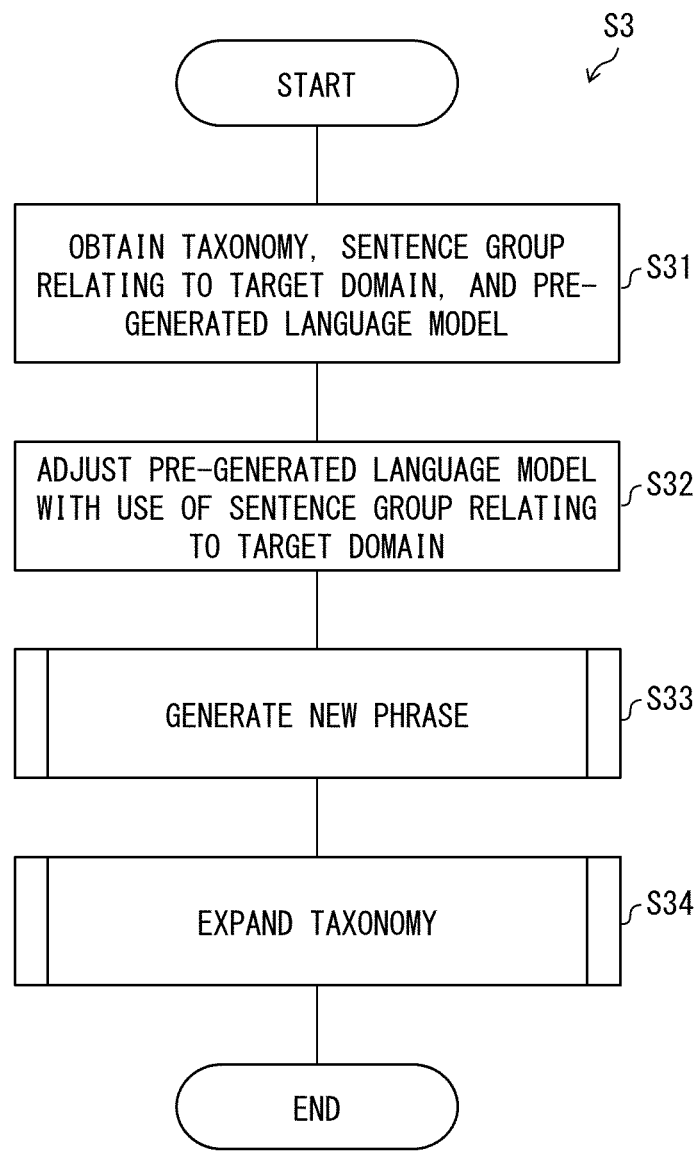
FIG. 12 is a flowchart illustrating a flow of an information processing method according to the third example embodiment of the present invention.
Figure 13:
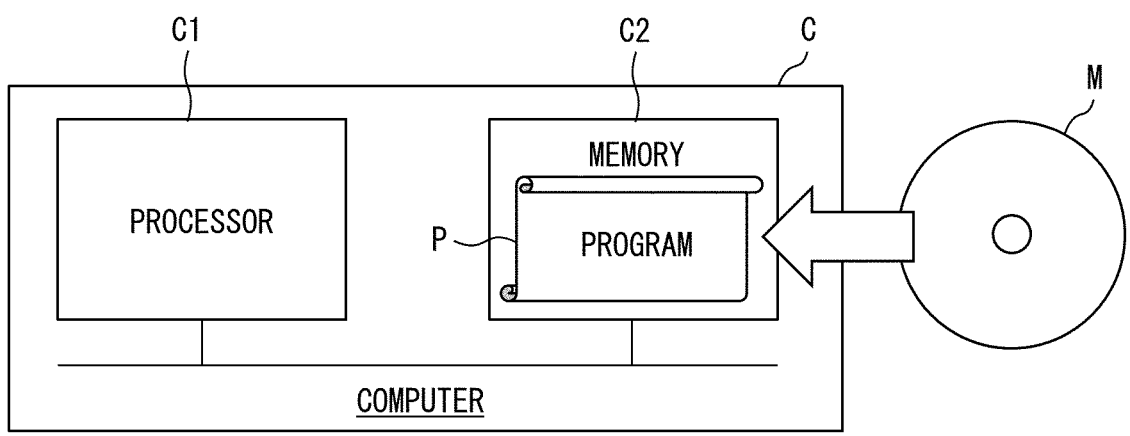
FIG. 13 is a block diagram illustrating an example hardware configuration of each of the information processing apparatuses according to the example embodiments of the present invention.

A flow of an information processing method S3 carried out by the information processing apparatus 3 configured as described above is described with reference to FIG. 12. FIG. 12 is a flowchart illustrating the flow of the information processing method S3. As illustrated in FIG. 13, the information processing method S3 includes steps S31 to S34.

(Step S31)

In the step S31, the obtaining section 31 obtains a taxonomy T1, a sentence group D1, and a pre-generated language model M4. For example, the obtaining section 31 may obtain the taxonomy T1, the sentence group D1, or the pre-generated language model M4 stored in a memory (not illustrated) of the information processing apparatus 3 or may alternatively obtain the taxonomy T1, the sentence group D1, or the pre-generated language model M4 from another apparatus which is connected to the information processing apparatus 3 via a network.

(Step S32)

In the step S32, the constructing section 32 generates a language model M5 by adjusting the pre-generated language model M4 with use of the sentence group D1.

(Step S33)

In the step S33, a generating section 22 carries out one of generating processes S23A and S23B in each of which the language model M5 is used, so as to generate a new phrase with reference to the sentence group D1. The generating section 22 may carry out a generating process in which the language model M5 is not used, instead of carrying out one of the generating processes S23A and S23B. Details of these generating processes are similarly described by replacing the language model M1 with the language model M5 in the detailed description of the step S23 in the second example embodiment.

(Step S34)

In the step S34, an expanding section 23 carries out one of expanding processes S24A and S24B in each of which the language model M5 is used, so as to expand the taxonomy T1. Alternatively, the expanding section 23 may carry out an expanding process in which the language model M5 is not used, instead of carrying out one of the expanding processes S24A and S24B. Note that, in a case where the generating process in which the language model M5 is not used is carried out in the step S33, one of the expanding processes S24A and S24B in each of which the language model M5 is used is carried out in this step. Details of these expanding processes are similarly described by replacing the language model M1 with the language model M5 in the detailed description of the step S24 in the second example embodiment.

Example Effects of the Third Example Embodiment

In the third example embodiment, the language model M5 obtained by adjusting the pre-generated language model M4 is used as a language model that is used to expand the taxonomy T1 relating to a target domain. Thus, it is possible to bring about the same effect as that brought about in the second example embodiment without requiring a process of constructing the language model.

First Modification

Note that in the second and third example embodiments, the expanding section 23 may generate a sentence in which it is hypothesized that any of a plurality of kinds of relationships exists between a new phrase and any of a plurality of existing phrases, as a sentence including the new phrase and the any of the plurality of existing phrases. Detailed examples of the plurality of kinds of relationships include a belonging relationship and a country-capital city relationship. The belonging relationship is, for example, a relationship between the name of a sport team and the name of a player belonging to the sport team. The country-capital city relationship is, for example, a relationship between the name of a country and the name of a capital city of the country.

For example, the expanding section 23 generates a sentence A "<new phrase> belongs to <existing phrase>" and a sentence B "<existing phrase> belongs to <new phrase>", as sentences in each of which a belonging relationship is hypothesized. The expanding section 23 also generates a sentence C "<new phrase> is the center of <existing phrase>" and a sentence D "<existing phrase> is the center of <new phrase>", as sentences in each of which a country-capital city relationship is hypothesized.

In a case where the expanding process S24A is carried out, the expanding section 23 calculates degrees of confidence in the respective generated sentences A to D, with use of the language model M1 (or M5). The expanding section 23 associates the new phrase with the existing phrase with reference to the degrees of confidence calculated.

In a case where the expanding process S24B is carried out, the expanding section 23 inputs each of the generated sentences A to D into the determination model M20, and associates the new phrase with the existing phrase with reference to determination results.

By making such modification in each example embodiment, it is possible to associate the new phrase with any of the existing phrases that has a more appropriate kind of relationship with the new phrase.

Second Modification

Note that the second and third example embodiments can be modified so that the adjusting sections 25 and 35 are respectively not included. In other words, in each example embodiment, the process of adjusting the language model M1 or M4 is not essential. In this case, in the second example embodiment, at least one of the generating section 22 and the expanding section 23 uses the language model M1 which is not adjusted. In this case, in the third example embodiment, the generating section 22 and the expanding section 23 use the pre-generated language model M4. Even in this case, in each example embodiment, it is possible to accurately generate the new phrase with reference to the sentence group D1, and possible to accurately associate the new phrase and any of the existing phrases.

Note, however, that in a case where the language models M1 and M5 which have been adjusted are used, it is possible to correct a relationship between phrases or words relating to the target domain. Therefore, an effect that accuracy of generation of a phrase and accuracy of association of phrases are improved is brought about. Thus, in the second and third example embodiments, it is desirable that the adjusting sections 25 and 35 be respectively included.

Another Modification

Further, in the second and third example embodiments, in the step S23 or S33, the new phrase may be generated from the sentence group D1 with use of another method in which the language model M1 (or M5) is used, instead of the generating process S23A or S23B. Further, in the second and third example embodiments, in the step S24 or S34, the new phrase may be associated with any of the existing phrases with use of another method in which the language model M1 (or M5) is used, instead of the expanding process S24A or S24B.

Software Implementation Example

A part or all of the functions of each of the information processing apparatuses 1 to 3 may be realized by hardware such as an integrated circuit (IC chip) or may be alternatively realized by software.

In the latter case, the information processing apparatuses 1 to 3 are each realized by, for example, a computer that executes instructions of a program that is software realizing the functions. FIG. 13 illustrates an example of such a computer (hereinafter, referred to as "computer C"). The computer C includes at least one processor C1 and at least one memory C2. In the memory C2, a program P for causing the computer C to operate as each of the information processing apparatuses 1 to 3 is recorded. In the computer C, the functions of each of the information processing apparatuses 1 to 3 are realized by the processor C1 reading the program P from the memory C2 and executing the program P.

The processor C1 can be, for example, a central processing unit (CPU), a graphic processing unit (GPU), a digital signal processor (DSP), a micro processing unit (MPU), a floating point number processing unit (FPU), a physics processing unit (PPU), a microcontroller, or a combination thereof. The memory C2 can be, for example, a flash memory, a hard disk drive (HDD), a solid state drive (SSD), or a combination thereof.

Note that the computer C may further include a random access memory (RAM) in which the program P is loaded when executed and/or in which various kinds of data are temporarily stored. The computer C may further include a communication interface via which the computer C transmits and receives data to and from another apparatus. The computer C may further include an input/output interface via which the computer C is connected to an input/output apparatus such as a keyboard, a mouse, a display, and a printer.

The program P can also be recorded in a non-transitory tangible recording medium M from which the computer C can read the program P. Such a recording medium M can be, for example, a tape, a disk, a card, a semiconductor memory, a programmable logic circuit, or the like. The computer C can acquire the program P via such a recording medium M. The program P can also be transmitted via a transmission medium. Such a transmission medium can be, for example, a communication network, a broadcast wave, or the like. The computer C can acquire the program P via such a transmission medium.

Additional Remark 1

The present invention is not limited to the foregoing example embodiments, but may be altered in various ways by a skilled person within the scope of the claims. For example, the present invention also encompasses, in its technical scope, any example embodiment derived by appropriately combining technical means disclosed in the foregoing example embodiments.

Additional Remark 2

The whole or part of the example embodiments disclosed above can be described as follows. Note, however, that the present invention is not limited to the following example aspects.

Supplementary Note 1

An information processing apparatus including:
- an obtaining means for obtaining a taxonomy which indicates a relationship between a plurality of phrases;
- a generating means for generating, with reference to a first sentence group, a new phrase which differs from each of the plurality of phrases; and
- an expanding means for expanding the taxonomy by associating the new phrase with any of the plurality of phrases,
- one or both of the generating means and the expanding means using a language model.

With the above configuration, in a case where the generating means uses the language model, it is possible to use information indicated by the language model, in addition to information included in the first sentence group. Therefore, it is possible to more accurately generate the new phrase to be added to the taxonomy. In a case where the expanding means uses the language model, it is possible to correct a relationship between the new phrase and any of the plurality of existing phrases by utilizing a relationship between the phrases which relationship is indicated by the language model. Therefore, it is possible to more accurately associate the new phrase with any of the plurality of existing phrases. Therefore, in the present example embodiment, it is possible to expand the taxonomy more accurately.

Supplementary Note 2

The information processing apparatus according to Supplementary note 1, further including a constructing means for constructing the language model, which is referred to by the one or both of the generating means and the expanding means, on the basis of a second sentence group which includes sentences that are not included in the first sentence group.

With the above configuration, in a case where the generating means uses the language model, it is possible to use information that is indicated by the language model and that is not included in the first sentence group. Therefore, it is possible to more accurately generate the new phrase. In a case where the expanding means uses the language model, it is possible to use a relationship between phrases that are not included in the first sentence group, the relationship being indicated by the language model. Therefore, it is possible to more accurately associate the new phrase with any of the plurality of existing phrases.

Supplementary Note 3

The information processing apparatus according to Supplementary note 1 or 2, further including an adjusting means for adjusting the language model, which is referred to by the one or both of the generating means and the expanding means, on the basis of the first sentence group.

With the above configuration, since the generating means uses the language model which has been adjusted, it is possible to more accurately generate the new phrase. Further, since the expanding means use the language model which has been adjusted, it is possible to more accurately associate the new phrase with any of the plurality of existing phrases.

Supplementary Note 4

The information processing apparatus according to any one of Supplementary notes 1 to 3, wherein:
- the generating means generates the new phrase by extracting the new phrase from the first sentence group with use of an extraction model;
- the extraction model includes the language model and a determiner into which an output from the language model is inputted, and is generated, by machine learning in which training data is used, so that, in a case where a sentence included in the first sentence group is inputted into the language model, the determiner determines and outputs the new phrase; and
- the training data is data in which the plurality of phrases appearing in the first sentence group are regarded as ground truth.

With the above configuration, since the extraction model generated with use of the language model is used, it is possible to accurately extract the new phrase from the first sentence group.

Supplementary Note 5

The information processing apparatus according to any one of Supplementary notes 1 to 3, wherein the generating means generates the new phrase by predicting, with use of the language model, the new phrase that is suitable to a location which is in a sentence included in the first sentence group and in which the any of the plurality of phrases appears.

With the above configuration, it is also possible to generate the new phrase that is not included in the first sentence group, by predicting the new phrase with use of the language model.

Supplementary Note 6

The information processing apparatus according to any one of Supplementary notes 1 to 5, wherein the expanding means calculates, with use of the language model, a degree of confidence in a sentence including the new phrase and the any of the plurality of phrases, and associates the new phrase with the any of the plurality of phrases with reference to the degree of confidence calculated.

With the above configuration, it is possible to determine a relationship between the new phrase and a phrase that is already included in the taxonomy, with reference to the degree of confidence calculated by the language model. As a result, it is possible to more accurately associate the new phrase with the phrase that is already included in the taxonomy.

Supplementary Note 7

The information processing apparatus according to any one of Supplementary notes 1 to 5, wherein:
- the expanding means associates the new phrase with the any of the plurality of phrases with use of a determination model;
- the determination model includes the language model and a classifier into which an output from the language model is inputted, and is generated, by machine learning in which training data is used, so that, in a case where a sentence including the new phrase and the any of the plurality of phrases is inputted into the language model, the classifier outputs information indicating whether or not a relationship exists between the new phrase and the any of the plurality of phrases; and the training data is data in which whether or not a relationship exists between two of the plurality of phrases indicated by the taxonomy is regarded as ground truth.

With the above configuration, it is possible to determine a relationship between the new phrase and a phrase that is already included in the taxonomy, with use of the determination model in which a relationship indicated by the language model is used. As a result, it is possible to more accurately associate the new phrase with the phrase that is already included in the taxonomy.

Supplementary Note 8

The information processing apparatus according to Supplementary note 6 or 7, wherein the expanding means generates, as the sentence including the new phrase and the any of the plurality of phrases, a sentence in which it is hypothesized that any of a plurality of kinds of relationships exists between the new phrase and the any of the plurality of phrases.

With the above configuration, it is possible to associate the new phrase with a phrase that is already included in the taxonomy, in consideration of a kind of a relationship between these phrases. As a result, it is possible to more accurately carry out association.

Supplementary Note 9

An information processing method comprising:
(a) obtaining a taxonomy which indicates a relationship between a plurality of phrases;
(b) generating a new phrase which differs from each of the plurality of phrases, with reference to a first sentence group; and
(c) expanding the taxonomy by associating the new phrase with any of the plurality of phrases, in one or both of (b) and (c), a language model being used.

With the above configuration, the same effect as that brought about by Supplementary note 1 is brought about.

Supplementary Note 10

A program for causing a computer to function as an information processing apparatus,
the program causing the computer to function as:
an obtaining means for obtaining a taxonomy which indicates a relationship between a plurality of phrases;
a generating means for generating a new phrase which differs from each of the plurality of phrases, with reference to a first sentence group; and
an expanding means for expanding the taxonomy by associating the new phrase with any of the plurality of phrases,
one or both of the generating means and the expanding means using a language model.

With the above configuration, the same effect as that brought about by Supplementary note 1 is brought about.

Additional Remark 3

The whole or part of the example embodiments disclosed above can also be expressed as follows.

An information processing apparatus including at least one processor, the at least one processor carrying out:
an obtaining process of obtaining a taxonomy which indicates a relationship between a plurality of phrases;
a generating process of generating a new phrase which differs from each of the plurality of phrases, with reference to a first sentence group; and
an expanding process of expanding the taxonomy by associating the new phrase with any of the plurality of phrases,
in one or both of the generating process and the expanding process, the at least one processor using a language model.

Note that this information processing apparatus may further include a memory, and, in this memory, a program may be stored which is for causing the at least one processor to carry out the obtaining process, the generating process, and the expanding process. Alternatively, this program may be recorded in a computer-readable non-transitory tangible recording medium.

REFERENCE SIGNS LIST 1, 2, 3 Information processing apparatus
11, 21, 31 Obtaining section
12, 22 Generating section
13, 23 Expanding section
24 Constructing section
25, 35 Adjusting section

What is claimed is:
1. An information processing apparatus comprising
at least one processor configured to execute instructions stored in memory to cause the information processing apparatus to perform:
an obtaining process of obtaining a taxonomy which is represented as a directed graph having nodes and edges that indicate parent-child relationships between a plurality of phrases;
a generating process of generating, with reference to a first sentence group, a new phrase which differs from each of the plurality of phrases, the generating process comprising generating the new phrase by extracting the new phrase from the first sentence group using an extraction model, the extraction model comprising a language model and a determiner into which an output from the language model is input, the extraction model being trained by machine learning with training data in which the plurality of phrases appearing in the first sentence group are designated as ground truth, such that a sentence from the first sentence group, when input into the language model, causes the determiner to output the new phrase; and
an expanding process of expanding the taxonomy by:
generating a plurality of sentences corresponding to a plurality of existing phrases in the taxonomy, wherein a generated sentence hypothesizes a relationship between an existing phrase and the new phrase;
calculating, with the language model, a plurality of degrees of confidence corresponding to the plurality of generated sentences; and
associating the new phrase with one of the plurality of existing phrases based on the plurality of calculated degrees of confidence, the associating comprising adding a new node for the new phrase and a new edge connecting the new node to a node of the plurality of existing phrases in the taxonomy, wherein, in one or both of the generating process and the expanding process, the at least one processor uses the language model.

2. The information processing apparatus according to claim 1, wherein the at least one processor is further configured to execute the instructions to perform:
a constructing process of constructing the language model, which is used in one or both of the generating process and the expanding process, based on a second sentence group comprising sentences not included in the first sentence group.

3. The information processing apparatus according to claim 1, wherein the at least one processor is further configured to execute the instructions to perform:
an adjusting process of adjusting the language model, which is used in one or both of the generating process and the expanding process, based on the first sentence group.

4. The information processing apparatus according to claim 1, wherein in the generating process, the at least one processor generates the new phrase by predicting, with use of the language model, a new phrase suitable to a location in a sentence included in the first sentence group in which one of the plurality of phrases appears.

5. The information processing apparatus according to claim 1, wherein in the expanding process, the at least one processor calculates, with use of the language model, a degree of confidence in a sentence including the new phrase and one of the plurality of phrases, and associates the new phrase with the one of the plurality of phrases based on the degree of confidence.

6. The information processing apparatus according to claim 1, wherein, in the expanding process:
the at least one processor associates the new phrase with one of the plurality of phrases using a determination model;
the determination model comprises the language model and a classifier into which an output from the language model is input, the determination model being trained by machine learning with training data so that, when a sentence including the new phrase and one of the plurality of phrases is input into the language model, the classifier outputs information indicating whether a relationship exists between the new phrase and the one of the plurality of phrases; and
the training data comprises data in which relationships between phrases indicated by the taxonomy are designated as ground truth.

7. The information processing apparatus according to claim 5, wherein in the expanding process, the at least one processor generates, as the sentence including the new phrase and the one of the plurality of phrases, a sentence in which it is hypothesized that one of a plurality of kinds of relationships exists between the new phrase and the one of the plurality of phrases.

8. An information processing method comprising:
(a) obtaining a taxonomy which is represented as a directed graph having nodes and edges that indicate parent-child relationships between a plurality of phrases;
(b) generating, with reference to a first sentence group, a new phrase which differs from each of the plurality of phrases, the generating comprising extracting the new phrase from the first sentence group using an extraction model, the extraction model comprising a language model and a determiner into which an output from the language model is input, the extraction model being trained by machine learning with training data in which phrases appearing in the first sentence group are designated as ground truth, such that a sentence from the first sentence group, when input into the language model, causes the determiner to output the new phrase; and
(c) expanding the taxonomy by:
generating a plurality of sentences corresponding to a plurality of existing phrases in the taxonomy, wherein a generated sentence hypothesizes a relationship between an existing phrase and the new phrase;
calculating, with the language model, degrees of confidence corresponding to the plurality of generated sentences; and
associating the new phrase with one of the plurality of existing phrases based on the calculated degrees of confidence, the associating comprising adding a new node for the new phrase and a new edge connecting the new node to a node of the plurality of existing phrases in the taxonomy;
wherein, in one or both of (b) and (c), the language model is used.

9. A non-transitory recording medium storing a program for causing a computer to function as an information processing apparatus,
the program causing the computer to perform:
an obtaining process of obtaining a taxonomy which is represented as a directed graph having nodes and edges that indicate parent-child relationships between a plurality of phrases;
a generating process of generating, with reference to a first sentence group, a new phrase which differs from each of the plurality of phrases, the generating process comprising extracting the new phrase from the first sentence group using an extraction model, the extraction model comprising a language model and a determiner into which an output from the language model is input, the extraction model being trained by machine learning with training data in which phrases appearing in the first sentence group are designated as ground truth, such that a sentence from the first sentence group, when input into the language model, causes the determiner to output the new phrase; and
an expanding process of expanding the taxonomy by:
generating a plurality of sentences corresponding to a plurality of existing phrases in the taxonomy, wherein a generated sentence hypothesizes a relationship between an existing phrase and a new phrase;
calculating, with the language model, degrees of confidence corresponding to the plurality of generated sentences; and
associating the new phrase with one of the plurality of existing phrases based on the calculated degrees of confidence, the associating comprising adding a new node for the new phrase and a new edge connecting the new node to a node of the plurality of existing phrases in the taxonomy;
wherein, in one or both of the generating process and the expanding process, the program causes the computer to use the language model.

\* \* \* \* \*